Patented Apr. 19, 1927.

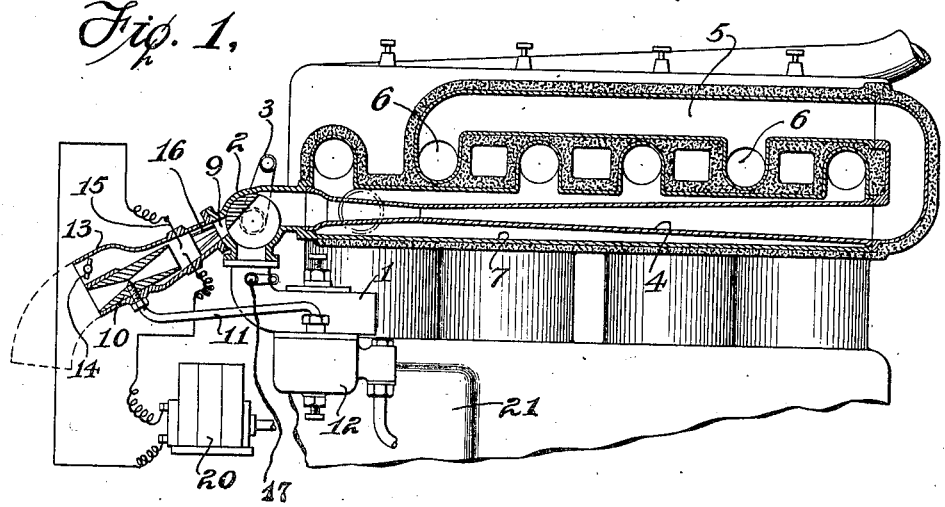
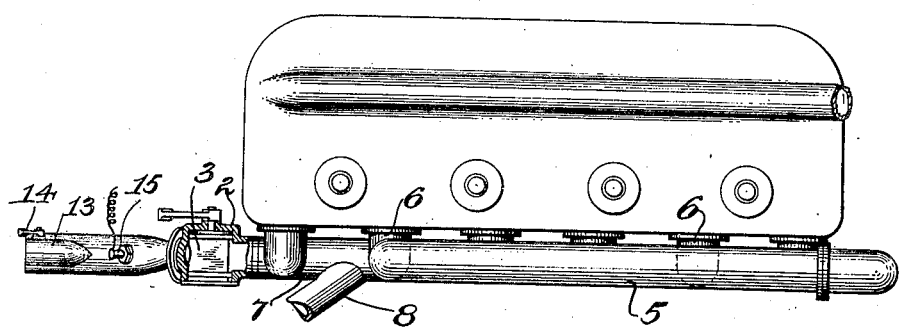
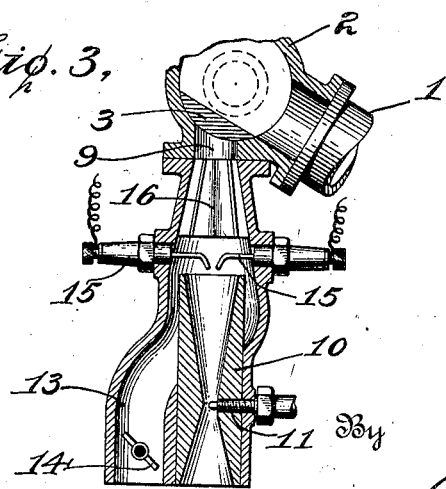

1,625,313

UNITED STATES PATENT OFFICE.

JOHN GOOD, OF GARDEN CITY, NEW YORK, ASSIGNOR TO GOOD INVENTIONS CO., OF NEW YORK, N. Y., A CORPORATION OF NEW YORK.

COMBUSTION APPARATUS.

Original application filed February 21, 1917, Serial No. 149,998. Divided and this application filed March 20, 1920. Serial No. 367,441.

The invention relates to certain combinations of suction-operated burners with the carburetors of internal combustion engines, whereby the flame or flame products of the former are utilized to heat the fuel liquid supplied to the engine by the carburetor and by direct contact with such liquid for the purpose of vaporizing it, thereby enabling the engine—in an automobile, for example—to be promptly started on low grade fuel, or in cold weather, and otherwise improving the action of the engine in various ways.

This application is a division of the application for my Patent No. 1,334,446 granted March 23, 1920, and likewise discloses certain features disclosed and claimed in my further co-pending Patent 1,377,990 issued May 10, 1921, and the invention of this application concerns the structure and manner of application of the suction burner to the charge mixture supply apparatus of the engine, whereby certain heating and starting effects may be produced with minimum complication of apparatus. The suction burner according to the present invention may be utilized to deliver a considerable extent of naked flame into direct contact with the carburetor mixture for vaporizing the same without inflaming it. It may also be constructed to deliver a partially combusted gas to the intake for use alone or in admixture with the carburetor mixture, and finally, the suction burner may be used successively or alternately with the carburetor, that is to say, may be first operated alone for preheating the intake passage and then shut off and the carburetor started in action.

In the accompanying drawings,

Fig. 1 is a longitudinal vertical section through the exhaust and suction headers of a multi-cylinder engine with the invention applied;

Fig. 2 is a top plan of Fig. 1, omitting the lagging of the headers; and

Fig. 3 is an enlarged longitudinal section of the suction burner proper.

In the engine shown and in its working process, the fuel mixture from the fuel and air proportioner or carburetor 1, is drawn through the elbow connection 2, containing a barrel type switch valve 3, and into a thin Venturi-form vaporizer tube 4, which is externally heated by the engine exhaust, and passes from this heated tube to the inlet header 5 and through the latter to the inlet port 6. The exhaust header 7 serving the four exhaust ports shown and surrounding the vaporizer tube, discharges to an offtake 8, and both the headers and their connections are preferably covered with heat-insulating lagging.

The valve 3 has a handle by which it may be turned to control the connection of the intake to the carburetor 1, and to the passage 9, which latter forms the connection to the suction burner. When the valve is opened to the burner, the suction effect created by the rotation of the engine, whether by hand crank, starting motor or its own operation, causes an inflow of air and liquid fuel to the burner, producing an ignitable mixture therein of controlled proportions and that mixture is coincidently and automatically ignited so that the flame is thus automatically produced and drawn into the intake.

The suction burner comprises a spray-producing device in the form of a Venturi tube 10 interposed in the suction flow, having a liquid fuel nozzle 11 opening into its narrow throat and supplied with liquid through a small pipe from the float bowl 12 of the carburetor. The burner thus operates on the same fuel as used by the engine and derives it from the same constant level receptacle, which latter is thus always in action so long as the engine is operating. The air flow through the Venturi tube 10 creates a local relative vacuum, with high velocity at the throat which serves to lift the fuel from the float bowl and produces a finely atomized spray directed toward the passage 9. Additional air is at the same time drawn into the burner through the air passage 13, joining the spray at or just beyond and also around the end of the tube 10, but not in such manner as to establish an immediate homogeneous mixture with the spray. The relative quantities of air and fuel so admitted to the burner head are subject to adjustment by the valve 14 and are normally so adjusted as to produce explosive proportions in the burner, i. e., proportions which will burn without much excess of air or fuel in the combustion products. Such a mixture will burn with complete combustion within the engine passages. While the proportions are those of an explosive mixture, it is important that homogeneity of such a mixture be avoided at the point of ignition as otherwise the effect of the ignition results merely in explosions and not in steady or continuous combustion. The spray from the tube 10 is ignited by a spark between the electrodes 15 placed at the exit of the tube, with the gap located at a point where the incoming air from the passage 13 has not so completely mingled with the spray as to prevent proper ignition. The part 16 intervening between the igniter and the passage 9 is a partitioning member, star-shaped in cross section. its function being to give direction to the streams of air and fuel spray (ignited) as they enter the passage 9, and also to assist in vaporizing such particles of liquid fuel as happen to strike it. Its wing parts are thin and placed edgewise to the flow.

The flame or flame products from the burner enter the engine intake passage just above the normal throttle 17 of the carburetor, i. e., between the throttle and the engine, so that when the passage 9 is open, as shown in Fig. 1, the suction effect of the rotating engine may be extended either wholly to the burner or partly to the burner and partly to the carburetor in varying relative degrees and according to the adjustment of the valves.

When an engine equipped as above described is to be set in operation, the electric starting motor indicated at 21, is used in the usual way to rotate the engine, thereby creating a suction effect in the intake header, which is in whole or in part communicated to the suction burner, and coincidently therewith the magneto generator 20, connected to the engine, is also rotated and an igniting current is produced so that flame immediately starts to flow into the intake. If at the same time the passage to the carburetor be open, the normal carburetor mixture will also be delivered into the intake for direct contact with the ignited mixture from the burner and will become vaporized thereby but without becoming itself ignited, the result being that the engine immediately receives a warm vaporized and readily combustible mixture or medium, upon which it immediately takes up its normal cycle. The continuing suction continues the operation of the burner as well as the carburetor. It is obvious that by adjustment of valve 3 and throttle 17, the suction effect imparted to the burner may be varied or completely shut off and that the rate of delivery of carburetor mixture may also be similarly varied. If the valve 3 be only slightly opened, the mixture produced in the carburetor although of proportions adapting it to burn completely, may not have time to do so because the flame is extinguished by the high velocity effect at the restriction represented by the small valve opening. In such case the flame products entering the intake header, although quite hot, contain a portion of unburned fuel and air, which constitute such products as an engine operating medium capable of use to supplement the carburetor mixture as well as to heat it. This method of operating the described apparatus is not herein claimed as it forms the subject of a companion application.

The proportions of the mixture in the suction burner may obviously be controlled by the valve 14 to give various effects in respect to the quality of the combustion products, but, as above stated, that valve is preferably set to provide complete or explosive proportions in the burner, which will give an abundantly rapid development of heat without tending to foul the interior passages. But the valve 14 is also available for use as a manually operated means for momentarily or initially restricting the air flow to the burner, so as to make the mixture therein temporarily rich, which is sometimes desirable to facilitate ignition, after which it can be restored to its normal position. Ordinarily, however, a proper setting of the valve in the first instance will suffice to produce automatic ignition and proper combustion. The length of the connecting passage 9 is a factor controlling the length of the flame penetrating the intake and it is desirably made fairly short, as indicated, so that while the flame has ample time to become established in the burner there is yet an adequate part of it in the intake passage, suited to give prompt vaporization.

Claims:

1. The combination in an internal combustion engine of a suction intake, an engine carburetting device, a flame-producing combustion device, a common source of liquid fuel for both devices, and a valve for connecting either of said devices to the intake.

2. The combination of an internal combustion engine, a carburetor therefor having a float-controlled constant-level fuel receptacle, and an automatic combustion device having air supply means and a fuel delivery orifice connected to said receptacle and supplied with fuel liquid therefrom, said two devices being both in suction relation to the engine and operated by the suction thereof, and said air supply being organized to cause the lifting of the liquid from said receptacle to said orifice.

3. The combination of an internal combustion engine having an intake passage, a carburetor having a float-controlled constant-level receptacle for liquid fuel connected to said passage, an automatic suction burner having entrances for fuel and air, an igniter and an outlet for flame or flame products connected to said passage and means operated by the effect of the air flow to said burner for conducting liquid fuel from said receptacle to the liquid fuel entrance of the burner.

4. An internal combustion engine having an intake, a carbureting device adapted to produce an engine-operating mixture of fuel and air and an electrically ignited combustion device, both connected to said intake and operated by the suction therein, said combustion device comprising suction means for producing a spray of liquid fuel, an electric spark igniter intercepting said spray and a suction air flow passage and manually-operated means for temporarily restricting said air passage and thereby increasing the relative liquid delivery to said combustion device.

In testimony whereof, I have signed this specification.

JOHN GOOD.